(12) United States Patent
Walsh

(10) Patent No.: US 12,239,149 B1
(45) Date of Patent: Mar. 4, 2025

(54) COMPOSITIONS AND METHODS OF PRODUCING COOKED EGG PRODUCTS

(71) Applicant: David Walsh, Andover, MA (US)

(72) Inventor: David Walsh, Andover, MA (US)

(*) Notice: Subject to any disclaimer, the term of this patent is extended or adjusted under 35 U.S.C. 154(b) by 0 days.

(21) Appl. No.: 18/373,055

(22) Filed: Sep. 26, 2023

(51) Int. Cl.
| | | |
|---|---|---|
| *A23L 15/00* | (2016.01) | |
| *A23B 5/06* | (2006.01) | |
| *A23L 5/10* | (2016.01) | |
| *A23P 20/10* | (2016.01) | |
| *A23P 30/10* | (2016.01) | |
| *A47J 36/02* | (2006.01) | |
| *A47J 36/04* | (2006.01) | |
| *B65D 65/42* | (2006.01) | |
| *B65D 81/34* | (2006.01) | |
| *A47J 29/02* | (2006.01) | |

(52) U.S. Cl.
CPC ............... *A23L 15/20* (2016.08); *A23B 5/06* (2013.01); *A23L 5/15* (2016.08); *A23P 20/11* (2016.08); *A23P 30/10* (2016.08); *A47J 36/027* (2013.01); *A47J 36/04* (2013.01); *B65D 65/42* (2013.01); *B65D 81/3453* (2013.01); *A47J 29/02* (2013.01)

(58) Field of Classification Search
CPC ..... A23L 5/15; A23L 5/17; A47J 29/00; A47J 29/02; A47J 29/04; B65D 81/3446; B65D 81/3453; B65D 65/42; A23P 20/10; A23P 20/11

See application file for complete search history.

(56) References Cited

U.S. PATENT DOCUMENTS

| | | |
|---|---|---|
| 281,849 A | 7/1883 | Dunham et al. |
| 294,849 A | 3/1884 | Cadwell |
| 433,161 A | 7/1890 | Benoit |
| 565,260 A | 8/1896 | Cook |
| 586,005 A | 7/1897 | Black |
| 726,478 A | 4/1903 | Sumpter |
| 786,256 A | 4/1905 | Axford |
| 846,763 A | 3/1907 | Thompson |
| 865,527 A | 9/1907 | Radtke |
| 920,973 A | 5/1909 | Meyer |
| 1,144,232 A | 6/1915 | Osborn |
| 1,335,300 A | 3/1920 | Schwartzberg |
| 1,464,628 A | 8/1923 | Schwartzberg |
| 1,767,802 A | 6/1930 | Langos |
| 1,830,070 A | 11/1931 | Miller |
| 1,900,290 A | 3/1933 | Harold |
| 1,922,177 A | 8/1933 | Ryde |
| 2,160,902 A | 6/1939 | Raymond |
| 2,179,676 A | 11/1939 | Vogt |
| 2,419,674 A | 4/1947 | Sidney |
| 2,517,167 A | 8/1950 | Bemis |

(Continued)

OTHER PUBLICATIONS

Eggs NPL, published Nov. 18, 2013, https://web.archive.org/web/20131118102417/https://www.eggs.ca/recipes/basic-microwaved-eggs (Year: 2013).*

(Continued)

*Primary Examiner* — Erik Kashnikow
*Assistant Examiner* — Bryan Kim
(74) *Attorney, Agent, or Firm* — Foley Hoag LLP; David P. Halstead; Caroline A. Werlang

(57) ABSTRACT

The instant application describes cooked egg products with distinct egg yolk and white components that have a leavened, soft texture, and methods of producing them.

15 Claims, 3 Drawing Sheets

(56) References Cited

U.S. PATENT DOCUMENTS

| | | | |
|---|---|---|---|
| 2,740,505 A | 4/1956 | Flora | |
| 3,166,005 A | 1/1965 | Ivar | |
| 3,264,974 A | 8/1966 | Miller et al. | |
| 3,638,583 A | 2/1972 | Goodier et al. | |
| 3,712,208 A | 1/1973 | Adolphi | |
| 3,713,422 A | 1/1973 | Sato et al. | |
| 3,720,156 A | 3/1973 | Hentschel et al. | |
| 3,753,737 A | 8/1973 | Latham et al. | |
| 3,757,741 A | 9/1973 | Siciliano | |
| 3,769,958 A | 11/1973 | Kozinczuk | |
| 3,808,341 A | 4/1974 | Hooss | |
| 3,843,813 A | 10/1974 | Driggs | |
| 3,889,003 A | 6/1975 | Yourman | |
| 4,098,906 A | 7/1978 | Hisaki et al. | |
| 4,130,749 A | 12/1978 | Tanaka et al. | |
| 4,133,996 A | 1/1979 | Fread | |
| 4,228,193 A | 10/1980 | Schindler et al. | |
| 4,280,032 A | 7/1981 | Levinson | |
| 4,426,400 A | 1/1984 | Newlin et al. | |
| 4,681,027 A | 7/1987 | Meamber | |
| 4,978,542 A | 12/1990 | Buckley | |
| D313,768 S | 1/1991 | White | |
| 4,990,349 A | 2/1991 | Chawan et al. | |
| 5,266,339 A | 11/1993 | Samson et al. | |
| 5,427,016 A | 6/1995 | Dunckel | |
| 5,427,816 A | 6/1995 | Harlaux et al. | |
| 5,567,453 A | 10/1996 | Reutimann et al. | |
| 5,665,416 A | 9/1997 | Mrozik et al. | |
| 5,807,597 A | 9/1998 | Barnes et al. | |
| 6,104,004 A | 8/2000 | Ragland et al. | |
| 6,162,478 A | 12/2000 | Koch | |
| 6,288,179 B1 | 9/2001 | Baur et al. | |
| 6,376,817 B1 | 4/2002 | McFadden et al. | |
| 6,620,449 B1 | 9/2003 | Peers | |
| 6,846,504 B1 | 1/2005 | Yarnell | |
| 7,000,530 B2 | 2/2006 | Damrath | |
| 7,205,517 B2 | 4/2007 | Hoh | |
| 7,213,508 B2 | 5/2007 | Staton | |
| 7,682,645 B2 | 3/2010 | Sanderson et al. | |
| 8,460,726 B2* | 6/2013 | Harel | A23K 40/30 426/61 |
| 8,847,123 B2 | 9/2014 | Shoshan | |
| 9,271,596 B2 | 3/2016 | Seddon | |
| 9,536,255 B2 | 1/2017 | Reeves-Collins | |
| 9,603,477 B2 | 3/2017 | Hoare et al. | |
| 9,609,968 B2 | 4/2017 | Garrels | |
| 10,251,414 B2 | 4/2019 | Merkle et al. | |
| 10,506,822 B2 | 12/2019 | Auernheimer et al. | |
| 10,575,671 B2 | 3/2020 | Heaney | |
| D881,634 S | 4/2020 | Garman et al. | |
| 11,132,918 B2 | 9/2021 | Young et al. | |
| 11,246,329 B2 | 2/2022 | Grinnell et al. | |
| 11,252,982 B2 | 2/2022 | Martrin-Donos | |
| D951,695 S | 5/2022 | Quarless | |
| 2002/0041920 A1 | 4/2002 | Fernandez | |
| 2003/0118714 A1* | 6/2003 | Merkle | A23L 15/20 426/614 |
| 2004/0047953 A1 | 3/2004 | Lauby | |
| 2005/0244566 A1 | 11/2005 | Poltnikov | |
| 2006/0019001 A1 | 1/2006 | Levinson | |
| 2006/0029716 A1 | 2/2006 | Harker | |
| 2006/0159806 A1 | 7/2006 | Darin et al. | |
| 2006/0210687 A1 | 9/2006 | Lundberg et al. | |
| 2006/0222739 A1 | 10/2006 | Kiesling | |
| 2007/0009645 A1 | 1/2007 | Holzer | |
| 2007/0045301 A1 | 3/2007 | Kumar | |
| 2007/0245904 A1 | 10/2007 | Pinchuk | |
| 2008/0110348 A1 | 5/2008 | Wallis | |
| 2008/0305222 A1 | 12/2008 | Takenaka | |
| 2009/0252855 A1 | 10/2009 | Ewald et al. | |
| 2010/0051603 A1 | 3/2010 | Powell | |
| 2010/0151092 A1 | 6/2010 | Sus et al. | |
| 2010/0193507 A1 | 8/2010 | Zimmer et al. | |
| 2012/0094845 A1 | 4/2012 | Yurttas et al. | |
| 2012/0210884 A1 | 8/2012 | Stacey | |
| 2012/0321750 A1 | 12/2012 | Klene | |
| 2013/0084366 A1 | 4/2013 | Kaufman et al. | |
| 2013/0095222 A1 | 4/2013 | Monassebian | |
| 2013/0129875 A1 | 5/2013 | Krauch et al. | |
| 2015/0320253 A1 | 11/2015 | Hu et al. | |
| 2016/0316774 A1* | 11/2016 | Lara | A23B 5/065 |
| 2018/0014560 A1 | 1/2018 | Waltz | |
| 2018/0116440 A1 | 5/2018 | Killicarslan | |
| 2020/0170262 A1 | 6/2020 | Reed | |
| 2020/0196646 A1 | 6/2020 | Gildersleeve et al. | |
| 2020/0205450 A1 | 7/2020 | Esquivel et al. | |
| 2021/0307131 A1* | 9/2021 | Heimerdinger | A47J 37/046 |
| 2022/0192410 A1 | 6/2022 | Lentini et al. | |
| 2022/0248729 A1 | 8/2022 | Kessler | |
| 2022/0264710 A1 | 8/2022 | Kim | |
| 2023/0067009 A1* | 3/2023 | Plichon | A21B 3/132 |
| 2023/0389578 A1* | 12/2023 | Hannah | A23L 5/15 |

OTHER PUBLICATIONS

SBLY NPL, published Sep. 5, 2023, https://sweetandsavory.co/layer-biscuit-bundt-breakfast-recipe/?4f1e054b-09ef-44dd-bb70-6f5325e49f62=1 (Year: 2023).*

Silicone NPL, published 2007, https://coderanch.com/t/44113/Dish-Silicone-Bakeware (Year: 2007).*

"What is the safe temperature to cook eggs?," Egg Safety Center, accessed online via <https://eggsafety.org/faq/what-is-the-best-temperature-to-cook-an-egg/> (Year: 2020).

Merrychef, "Merrychef E4 Recipe and Demonstration Guidelines", Eikon, pp. 1-17 (2012).

Monroe, "How to make a frittata in a Bundt pan (video)," Cooktop Cove, accessed online via <https://cooktopcove.com/2017/01/06/how-to-make-a-frittata-in-a-bundt-pan-video> (Year: 2017).

Pactiv, "Presware Dual Ovenable Paperboard Containers", Pactiv Evergreen (2022).

* cited by examiner

COMPOSITIONS AND METHODS OF PRODUCING COOKED EGG PRODUCTS

BACKGROUND

Shirred eggs, also known as baked eggs, are a traditionally French method of cooking eggs with cream within individual ramekins in a conventional oven. They have been described as offering the same level of creamy indulgence as eggs benedict. While shirred eggs are delicious, they take a long time to prepare, as the cook must preheat a conventional oven and wait at least 12-20 minutes for the eggs to cook. In many commercial and home kitchens, there is an increased need for faster methods of cooking eggs in order to reduce wait times and increase productivity.

Both home chefs and commercial kitchens have therefore been experimenting with methods of cooking eggs in microwave ovens, which promise increased convenience and faster cooking times. Numerous methods of cooking eggs in microwave ovens within individual containers have been described. These methods typically require pre-whisking of the egg, creating a scrambled egg consistency. However, these microwaved scrambled eggs frequently have an undesirable tough and rubbery texture. Therefore, there is still a need for a rapid and reproducible method of cooking eggs in a microwave oven that results in a soft, cooked egg with the yolk intact.

BRIEF SUMMARY

The instant application describes cooked egg products with distinct egg yolk and white components that have a leavened, soft texture, and methods of producing them.

In one aspect, the present disclosure provides a cooked egg product, wherein the cooked egg product comprises discrete egg yolk portion(s) that are distinct from contiguous egg white(s); the egg yolk portion(s) have a texture between a medium- and hard-boiled egg; the cooked egg product has a defined form with distinct edges and substantially smooth sides; the total volume of the cooked egg product is substantially larger than the volume of the uncooked ingredients; the cooked egg product has a height to width ratio of at least 0.1; the top surface of the egg yolk and egg white do not directly interface with the surrounding air; and the egg white(s) substantially lack heat discoloration.

In another aspect, the present disclosure provides a method of producing the cooked egg product described herein, comprising: providing a cookware container having a bottom, a central tube extending upwardly from the bottom and defining an inner wall, and an outer wall extending upwardly from the bottom and arranged substantially concentrically around the central tube, defining an annular space therebetween, wherein the central tube defines an inner passage that permits airflow therethrough, and wherein the outer wall is within 15° of vertical at the top of the annular space; optionally disposing one or more secondary ingredients on the bottom of the cookware container in the annular space; depositing one to three unbeaten raw or pasteurized shelled eggs in the annular space in the cookware container on top of the secondary ingredients, if present; piercing the egg yolk(s) of the unbeaten raw or pasteurized shelled eggs; coating the upper surface of the unbeaten raw or pasteurized shelled eggs in the annular space to inhibit moisture and air egress from the one or more unbeaten raw or pasteurized shelled eggs during cooking thereof; placing the cookware container in a programmable convection microwave oven and applying radiant heat, convective heat, and microwave energy to the cookware container at a level sufficient to heat the raw or pasteurized shelled eggs and secondary ingredients to produce a cooked egg product having a leavened structure; and optionally removing the cooked egg product from the cookware container.

In yet another aspect, the present disclosure provides a packaged food comprising the cooked egg product described herein, wherein the packaging comprises paperboard.

DETAILED DESCRIPTION

Figure 1:
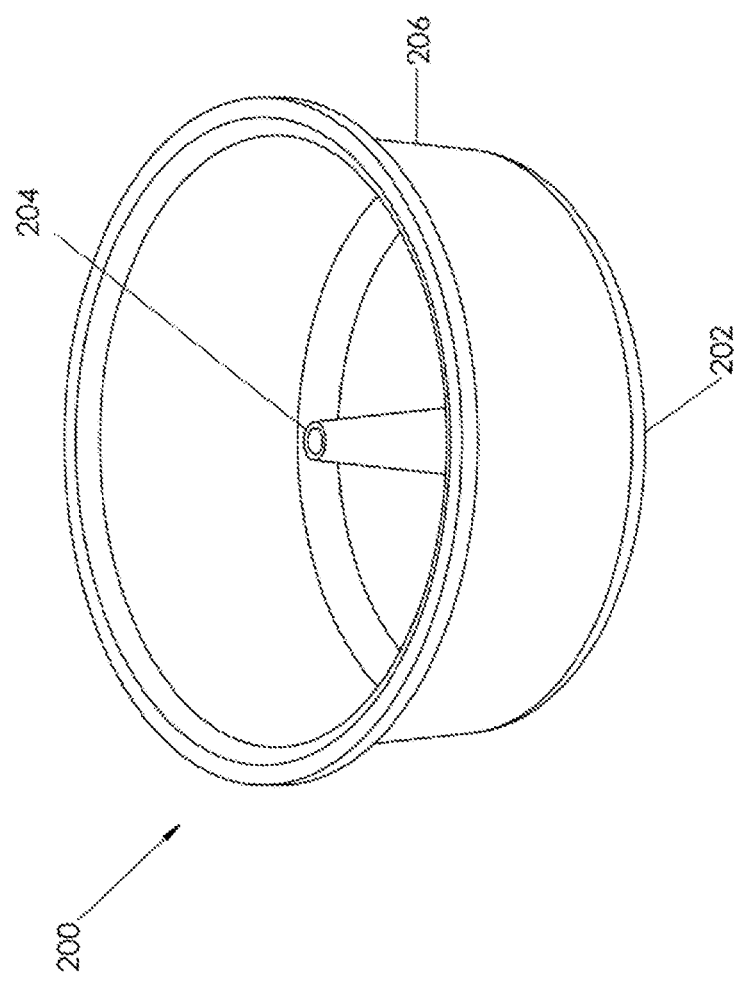
FIG. 1 illustrates an exemplary cookware container in accordance with one or more embodiments used in the process.

Various embodiments disclosed herein relate to methods and systems for commercially producing egg products. The process produces leavened egg products that are flavorful and have a light texture. The process is particularly suited for use in restaurants where custom made-to-order egg products can be produced quickly (in about a minute) in high volumes with minimal effort by restaurant workers. The egg products are uniformly cooked to safe temperatures without being overcooked and made dry or chewy. Hydration is provided by a combination of moisture provided by secondary ingredients (e.g., cheese, scallions, bacon) and a moisture barrier to inhibit drying out during the cooking process. Leavening is provided by the combination of air trapped in or by the secondary ingredients and steam generated by moisture of the egg and secondary ingredients.

In one aspect, the present disclosure provides a cooked egg product, wherein the cooked egg product comprises discrete egg yolk portion(s) that are distinct from contiguous egg white(s); the egg yolk portion(s) have a texture between a medium- and hard-boiled egg; the cooked egg product has a defined form with distinct edges and substantially smooth sides; the total volume of the cooked egg product is substantially larger than the volume of the uncooked ingredients; the cooked egg product has a height to width ratio of at least 0.1; the top surface of the egg yolk and egg white do not directly interface with the surrounding air; and the egg white(s) substantially lack heat discoloration.

In certain embodiments, the cooked egg product comprises fresh eggs. In other embodiments, the cooked egg product comprises pasteurized eggs.

In certain embodiments, the cooked egg product comprises 1 egg. In other embodiments, the cooked egg product comprises 2 eggs. In other embodiments, the cooked egg product comprises 3 eggs.

In certain preferred embodiments, the defined form is toroidal.

In some embodiments, the total volume of the cooked egg product is between 30-100% larger than the volume of the uncooked ingredients. In some embodiments, the total volume of the cooked egg product is about 30%, 35%, 40%, 45%, 50%, 55%, 60%, 65% 70%, 80%, 85%, 90%, 95%, or 100% larger than the volume of the uncooked ingredients.

In some embodiments, the cooked egg product has a height to width ratio between 0.2 and 1.0. In some embodiments, the height to width ratio is about 0.2, 0.3, 0.4, 0.5, 0.6, 0.7, 0.8, 0.9, or 1.0. In certain preferred embodiments, the height to width ratio is about 0.20, 0.22, 0.24, 0.26, 0.28, 0.30, 0.32, 0.34, 0.35, 0.36, 0.38, 0.40, 0.42, 0.45, 0.48, or 0.5. In certain preferred embodiments, the height to width ratio is between 0.2 and 0.6. In some preferred embodiments, the height to width ratio is between 0.3 and 0.8. In other embodiments, the height to width ratio is between 0.4 and 0.9. In embodiments where the defined form is toroidal, the width describes the outer diameter of the toroid. In embodiments where the defined form is cylindrical, the width describes the diameter of the cylinder.

In certain embodiments, the discrete egg yolk portion has a texture that is like a medium-boiled egg. In other embodiments, the discrete egg yolk portion has a texture that is slightly runny, substantially unset, or jammy. In other embodiments, the discrete egg yolk portion has a texture that is firm and set, as in a hard-boiled egg.

In some embodiments, the heat discoloration comprises browning (e.g., Maillard reaction). In some embodiments, the distinct edges substantially lack feathered edges.

In another aspect, the present disclosure provides a method of producing the cooked egg product described herein, comprising: providing a cookware container having a bottom, a central tube extending upwardly from the bottom and defining an inner wall, and an outer wall extending upwardly from the bottom and arranged substantially concentrically around the central tube, defining an annular space therebetween, wherein the central tube defines an inner passage that permits airflow therethrough, and wherein the outer wall is within 15° of vertical at the top of the annular space; optionally disposing one or more secondary ingredients on the bottom of the cookware container in the annular space; depositing one to three unbeaten raw or pasteurized shelled eggs in the annular space in the cookware container on top of the secondary ingredients, if present; piercing the egg yolk(s) of the unbeaten raw or pasteurized shelled eggs; coating the upper surface of the unbeaten raw or pasteurized shelled eggs in the annular space to inhibit moisture and air egress from the one or more unbeaten raw or pasteurized shelled eggs during cooking thereof; placing the cookware container in a programmable convection microwave oven and applying radiant heat, convective heat, and microwave energy to the cookware container at a level sufficient to heat the raw or pasteurized shelled eggs and secondary ingredients to produce a cooked egg product having a leavened structure; and optionally removing the cooked egg product from the cookware container.

In some embodiments, the egg yolk is pierced with a toothpick or knife. In other embodiments, the egg yolk is pierced with a fork or pick. In certain preferred embodiments, the egg yolk and egg white are not whisked, mixed, scrambled, or homogenized.

In some embodiments, the cookware container comprises silicone, ceramic, or paper-based material. In some preferred embodiments, the cookware container is ceramic.

In certain embodiments, a non-stick oil or butter coating is applied to the bottom of the cookware container prior to depositing the secondary ingredients in the cookware container to facilitate easy removal of the cooked egg product from the cookware container.

In some embodiments, the outer wall is within 15° of vertical. In some embodiments, the outer wall is within 5°, 10°, or 15° of vertical. In some preferred embodiments, the outer wall is within 10° of vertical. A steep outer wall of the cookware container can aid in the entrapment of air and moisture, facilitating leavening, and/or promote even cooking of the egg product.

In some embodiments, the annular space is releasably covered with a removable object during application of heat, optionally wherein the object comprises parchment paper, a silicone lid, or paperboard.

In some embodiments, the secondary ingredients are arranged in a manner that traps or retains air beneath the one or more unbeaten raw or pasteurized shelled eggs.

In yet another aspect, the present disclosure provides a packaged food comprising the cooked egg product described herein, wherein the packaging comprises paperboard.

Secondary Ingredients

In certain embodiments, the cooked egg product includes one or more secondary ingredients. In some embodiments, the secondary ingredients comprise one or more of oil (e.g., cooking oil or flavor oil), butter, cheese (e.g., cheddar cheese, parmesan cheese, or low-moisture mozzarella), low-moisture or partially dehydrated vegetables (e.g., raw scallions or dried tomatoes), or cooked meat products (e.g., cooked bacon).

In certain embodiments, the coating comprises one or more secondary ingredients. In some embodiments, the coating comprises cheese. In other preferred embodiments, the coating comprises oil. In some embodiments, the oil is selected from canola oil, soybean oil, safflower oil, sunflower oil, peanut oil, rapeseed oil, olive oil, avocado oil, flaxseed oil, sesame oil, coconut oil, garlic oil, paprika oil, or vegetable oil.

In some embodiments, the coating comprises a light coating of oil produced by a spray. In some preferred embodiments, the coating comprises a light coating of oil produced by a canola oil cooking spray.

A variety of other types of secondary ingredients can be used. For example, cooked pork-based products such as bacon, sausage, ham, prosciutto, and porchetta; cooked shellfish such as shrimp, lobster, crab, or scallops; dried or smoked fish, such as haddock and salmon, can all be used. Examples of low moisture or partially dehydrated vegetables include scallions, any type of onion, leeks, chives, peppers, small leaf ("baby") spinach, kale, mushrooms, olives, and sun-dried tomatoes. Many other types of secondary ingredient options can also be used and selected to suit the local menu. In addition, herbs, spices, flavored oils, and sauces can be included.

Description of Cookware Container

FIG. 1 illustrates an exemplary cookware container 200 in accordance with one or more embodiments used in the process. The cookware container 200 is a centrally vented container having a bottom 202, a central tube 204 extending upwardly from the bottom 202, and an outer wall 206 extending upwardly from the bottom 202. The outer wall 206 is arranged concentrically around the central tube 204 defining an annular space therebetween. The central tube permits airflow therethrough during the cooking process to provide even cooking of the eggs. The central tube 204 may have a truncated cone shape.

In one or more embodiments, the cookware containers 200, 210 comprise silicone, ceramic, paper-based materials, or any food-grade materials suitable for use in a convection microwave oven.

Figure 2:
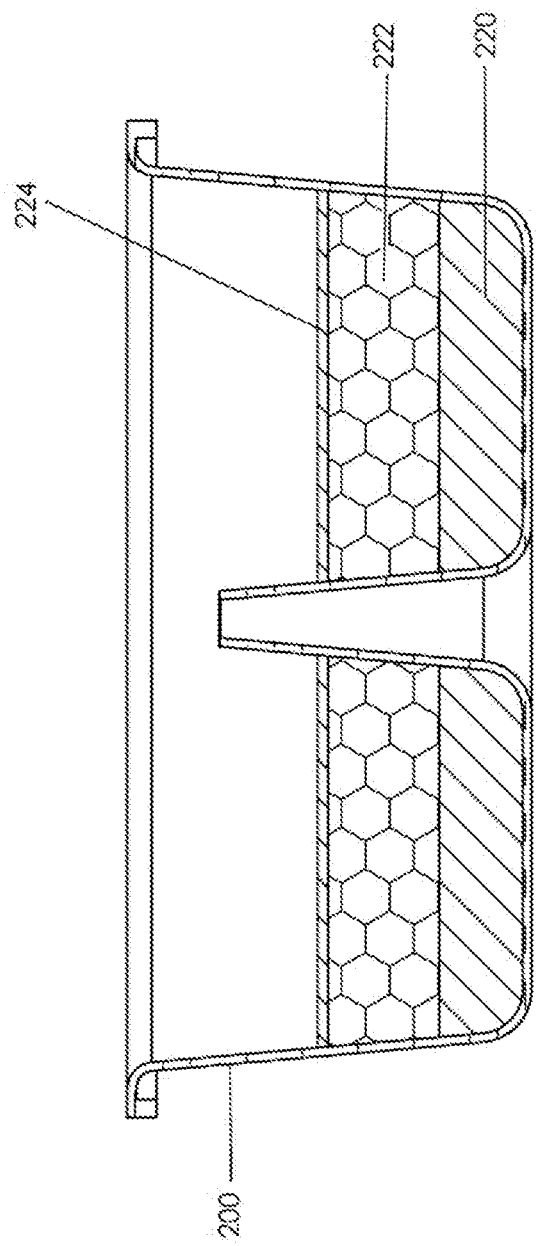
FIG. 2 is a cross-section view illustrating a cookware container containing ingredients before and after the cooking process in accordance with one or more embodiments.
Figure 3:
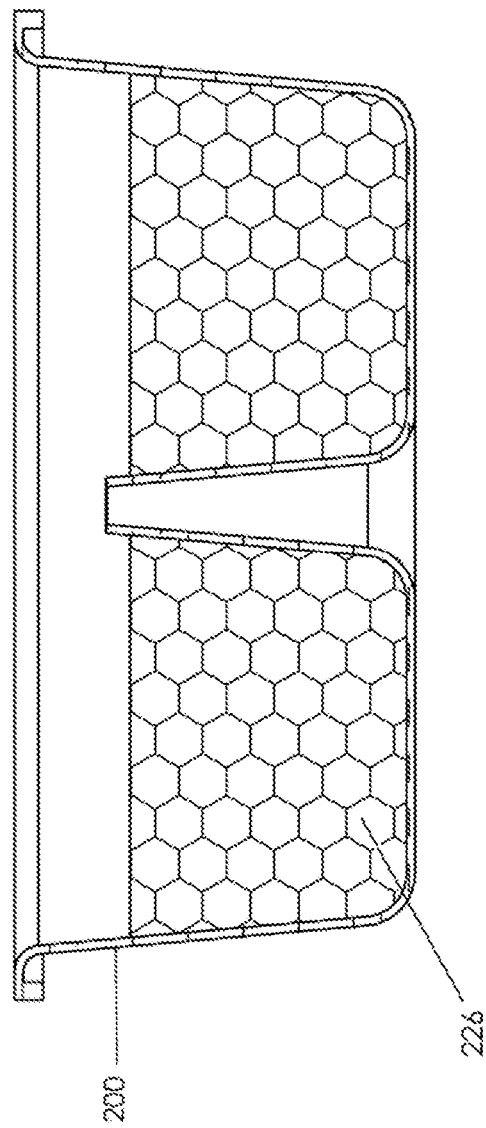
FIG. 3 is a cross-section view illustrating a cookware container containing ingredients before and after the cooking process in accordance with one or more embodiments.

FIG. 2 and FIG. 3 illustrate use of the cookware container 200 in the cooking process. FIG. 2 shows layering of the ingredients in the cookware container 200 before the cooking process. One or more secondary ingredients (e.g., cheese, scallions, and/or bacon) 220 are first deposited on the bottom of the cookware container 200.

Next, one to three raw or pasteurized eggs 222 are deposited in the cookware container 200 on top of the secondary ingredients 220. The secondary ingredients 220 are stacked in a manner trapping or retaining air beneath the eggs 222.

The egg yolks of the eggs 222 are then pierced to provide pressure modulation.

A covering 224 is then deposited on the eggs 222 to inhibit moisture and air egress from the eggs 222 and secondary ingredients 220 during the cooking process. As discussed in further detail herein, in one or more embodiments, the covering 224 comprises a layer of cooking oil (e.g., canola oil) sprayed or otherwise applied on the eggs 222.

Other types of coverings are also possible to inhibit moisture and air egress from the ingredients. For example, in one or more embodiments, the covering comprises a removable parchment paper or silicone lid fitted, or any food-grade materials suitable for use in a convection microwave oven to cover the annular space in the cookware container 200.

In one or more embodiments, the cookware container 200 may be one of multiple cookware containers attached side-by-side to each other or held by a carrier for use in simultaneously producing multiple cooked egg products in the oven.

FIG. 3 shows the cookware container 200 after the eggs and secondary ingredients are cooked to form a leavened cooked egg product 226 occupying a larger space in the cookware container.

Use of Convection Microwave Oven

The methods described herein are carried out in a convection microwave oven (e.g., MerryChef or TurboChef convection microwave ovens).

In some embodiments, the programmable convection microwave oven is programmed to apply convective heat and microwave energy to the cookware container in a plurality of successive stages, each stage having a given oven temperature, time period, convective heat fan speed, and microwave energy power level.

The temperature of the oven must be between 250-650° F. In some embodiments, the temperature of the microwave oven is about 250° F., 300° F., 350° F., 400° F., 450° F., 500° F., 550° F., 600° F., or 650° F. In some embodiments, the given oven temperature is about 500° F. for all stages.

In some embodiments, the microwave energy power level is lowered in each successive stage and the convective heat fan speed is increased in each successive stage.

In some embodiments, the total time period for all stages of microwave cooking is between 30 and 90 seconds. In some embodiments, the total time period for all stages of microwave cooking is between 50 and 70 seconds. In some embodiments, the total time period for microwave cooking is between 55 and 65 seconds. In some embodiments, the total time period for microwave cooking is 55, 56, 57, 58, 59, 60, 61, 62, 63, 64, or 65 seconds.

In some embodiments, the raw or pasteurized shelled eggs and secondary ingredients reach a temperature of at least 145, 150, 155, 160, or 165° F. In some preferred embodiments, the raw or pasteurized shelled eggs and secondary ingredients reach a temperature of at least 160° F.

The oven applies radiant heat, convective heat, and microwave energy to the cookware container at a level sufficient to raise the internal temperature of the raw or pasteurized shelled eggs and secondary ingredients uniformly to a safe internal temperature to produce a cooked egg product as shown in FIG. 3 having a leavened structure. Leavening is believed to be caused primarily by the air and moisture trapped in the secondary ingredients under the eggs and the top surface oil.

Without wishing to be bound by theory, the leavening occurs without a biological (e.g., yeast) or chemical (e.g., baking soda) leavening agent, relying instead on moisture from within the egg to create steam. The leavening process does not require the addition of sugars or grains.

The fast cooking process creates a leavened texture that is not readily achieved with conventional stovetop or oven cooking methods. The leavening typically occurs primarily in the egg white portion, and may be observed as visible air pockets when the product is cross-sectioned vertically. The uncooked egg product can be deposited into the cookware container substantially in the form in which it comes out of the shell; it does not need to be beaten, whipped, or otherwise mechanically to incorporate air or chemically altered with leavening agents such as baking soda or baking powder to achieve the leavening as described herein. The resulting light and soft texture is not available from typical microwave oven cooking methods. This texture is distinct from the texture of a frittata.

The oven is preferably programmed to apply convective heat and microwave energy to the cookware container in a plurality of successive stages, each stage having a given oven temperature, time period, convective heat fan speed, and microwave energy power level.

EQUIVALENTS

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

EXAMPLES

Example 1: Impact of Cookware Container Material and Shape on Leavening

Several cookware containers were tested for their impact on the texture of the cooked egg product. The leavening of the cooked egg product that is achieved during the application of heat in the methods disclosed herein was quantified through the change in height between the raw ingredients and the cooked egg product.

Four containers were examined:

|  | DISH DIAMETER (IN) |
| --- | --- |
| CERAMIC WITH CONE | 3.94 |
| SILICONE WITH CONE | 3.91 |
| CERAMIC WITHOUT CONE | 3.94 |
| SILICONE WITHOUT CONE | 3.91 |

The trials were conducted by the following method:
(1) providing a cookware container, with specifications described above, having a bottom, a central tube extending upwardly from the bottom and defining an inner wall, and an outer wall extending upwardly from the bottom and arranged substantially concentrically around the central tube, defining an annular space therebetween, wherein the central tube defines an inner passage that permits airflow therethrough, and wherein the outer wall is within 15° of vertical at the top of the annular space;

(2) disposing green onions, bacon, and cheddar cheese on the bottom of the cookware container in the annular space;

(3) depositing two unbeaten raw shelled eggs in the annular space in the cookware container on top of the secondary ingredients;

(4) piercing the egg yolks of the unbeaten raw shelled eggs with the point of a knife;

(5) coating the upper surface of the unbeaten raw shelled eggs in the annular space with a canola oil spray;

(6) measuring the depth of the raw ingredients;

(7) placing the cookware container in a MerryChef three phase convection microwave oven and applying the following settings:

| Stage | Temp (° F.) | Time (s) | Fan (%) | Microwave (%) |
|---|---|---|---|---|
| 1 | 500 | 13 | 67 | 96 |
| 2 | 500 | 33 | 69 | 85 |
| 3 | 500 | 13 | 75 | 77 | and (8) measuring the depth of the cooked ingredients.

The result of the trials, shown in the table below, demonstrate the changes in height (i.e., leavening) that are observed with the production method.

| | RAW DEPTH (IN) | COOKED DEPTH (IN) | PERCENT INCREASE | FINAL HEIGHT: WIDTH RATIO |
|---|---|---|---|---|
| CERAMIC WITH CONE | 0.896 | 1.272 | 42% | 0.32 |
| SILICONE WITH CONE | 0.837 | 1.255 | 50% | 0.32 |
| CERAMIC WITHOUT CONE | 0.811 | 1.386 | 71% | 0.35 |
| SILICONE WITHOUT CONE | 0.876 | 1.569 | 79% | 0.40 |

Every cookware container tested resulted in a more than 40% increase in volume of the cooked egg product, compared to the raw ingredients used in its production.

Example 2: Impact of Oil Spray on Product

The production process disclosed in Example 1 was repeated without the presence of an oil spray coating on the ingredients before the application of heat. The cooked egg product that resulted was dry and tough. Without wishing to be bound by theory, the presence of a coating on the upper surface of the unbeaten raw or pasteurized shelled eggs (possibly by inhibiting release of moisture and air) appears to favor the production of a cooked egg product with desirable texture.

I claim:

1. A method of producing a cooked egg product, comprising:

(a) providing a cookware container having a bottom, a central tube extending upwardly from the bottom and defining an inner wall, and an outer wall extending upwardly from the bottom and arranged substantially concentrically around the central tube, defining an annular space therebetween, wherein the central tube defines an inner passage that permits airflow therethrough, and wherein the outer wall is within 15° of vertical at the top of the annular space;

(b) depositing one to three unbeaten raw or pasteurized shelled eggs, each comprising an egg yolk and an egg white portion, in the annular space in the cookware container;

(c) piercing each yolk of the one to three unbeaten raw or pasteurized shelled eggs;

(d) coating the upper surface of the one to three unbeaten raw or pasteurized shelled eggs in the annular space by spraying oil on the upper surface of the shelled eggs, to inhibit moisture and air egress from the one to three eggs during cooking thereof;

(e) placing the cookware container in a programmable convection microwave oven and applying radiant heat, convective heat, and microwave energy to the cookware container at a level sufficient to heat the one to three unbeaten raw or pasteurized shelled eggs to produce the cooked egg product, said cooked egg product having a leavened structure in which each egg yolk is distinct from the egg white portion; and (f) optionally removing the cooked egg product from the cookware container.

2. The method of claim 1, wherein the method further comprises disposing one or more secondary ingredients on the bottom of the cookware container in the annular space prior to depositing the one to three eggs.

3. The method of claim 2, wherein the one or more secondary ingredients are selected from oil, butter, cheese, scallions, partially dehydrated vegetables, and cooked meat products.

4. The method of claim 1, wherein the oil is selected from canola oil, soybean oil, safflower oil, sunflower oil, peanut oil, rapeseed oil, olive oil, avocado oil, flaxseed oil, sesame oil, coconut oil, garlic oil, paprika oil, or vegetable oil.

5. The method of claim 1, wherein the annular space is releasably covered with a removable object during application of heat.

6. The method of claim 2, wherein disposing the one or more secondary ingredients comprises arranging the secondary ingredients in a manner that traps or retains air beneath the one to three unbeaten raw or pasteurized shelled eggs.

7. The method of claim 1, wherein the programmable convection microwave oven is programmed to apply convective heat and microwave energy to the cookware container in a plurality of successive stages, each stage having a given oven temperature, time period, convective heat fan speed, and microwave energy power level.

8. The method of claim 7, wherein the total time period for all stages is between 50 and 70 seconds.

9. The method of claim 8, wherein the microwave energy power level is lowered in each successive stage and the convective heat fan speed is increased in each successive stage.

10. The method of claim 1, wherein the cookware container comprises a material selected from the group consisting of silicone, ceramic, and paper-based material.

11. The method of claim 2, wherein the cookware container comprises a material selected from the group consisting of silicone, ceramic, and paper-based material.

12. The method of claim 1, wherein the upper surface of the one to three eggs does not directly interface with surrounding air.

13. The method of claim 5, wherein the removable object comprises a material selected from the group consisting of parchment paper, silicone, and paperboard.

14. The method of claim 2, wherein the one or more secondary ingredients comprise cooked shellfish, dried fish, smoked fish, or a cooked pork-based product.

15. The method of claim 2, wherein the one or more secondary ingredients comprise cooked shrimp, cooked lobster, cooked crab, cooked scallops, dried haddock, smoked haddock, dried salmon, smoked salmon, cooked bacon, cooked sausage, ham, prosciutto, or porchetta.

\* \* \* \* \*